United States Patent

Sato et al.

[11] Patent Number: 5,996,610
[45] Date of Patent: Dec. 7, 1999

[54] SOLENOID-OPERATED VALVE ASSEMBLY

[75] Inventors: Hideharu Sato; Ryushiro Kaneko; Shinji Miyazoe, all of Tsukuba-gun, Japan

[73] Assignee: SMC Corportion, Tokyo, Japan

[21] Appl. No.: 09/175,474

[22] Filed: Oct. 20, 1998

[30] Foreign Application Priority Data

Nov. 7, 1997 [JP] Japan ................................. 9-322089

[51] Int. Cl.⁶ .................................................. F16K 31/06
[52] U.S. Cl. ........................... 137/271; 137/560; 137/884
[58] Field of Search ................................... 137/269, 270, 137/271, 560, 884

[56] References Cited

U.S. PATENT DOCUMENTS

| | | | |
|---|---|---|---|
| 3,215,158 | 11/1965 | Bass, Jr. et al. | 137/269 |
| 3,504,704 | 4/1970 | Beckett et al. | 137/269 |
| 4,815,496 | 3/1989 | Nishitani et al. | 137/884 |
| 4,938,258 | 7/1990 | Sato | 137/884 |
| 5,333,647 | 8/1994 | Fukano et al. | 137/884 |
| 5,459,953 | 10/1995 | Fukano et al. | 137/884 X |
| 5,529,088 | 6/1996 | Asou | 137/271 X |
| 5,555,911 | 9/1996 | Fukano et al. | 137/884 X |
| 5,699,830 | 12/1997 | Hayashi et al. | 137/554 |
| 5,704,399 | 1/1998 | Hayashi et al. | 137/884 |
| 5,706,858 | 1/1998 | Miyazoe et al. | 137/884 |
| 5,771,918 | 6/1998 | Fukano et al. | 137/269 |
| 5,918,629 | 7/1999 | Hayashi et al. | 137/560 |

*Primary Examiner*—John Rivell
*Attorney, Agent, or Firm*—Oblon, Spivak, McClelland, Maier & Neustadt, P.C.

[57] ABSTRACT

A solenoid-operated valve assembly is configured in such a way that one of multiple receiving connectors 4A and 4B of different forms is attached to a first end block 2a via the corresponding one of holders 5A and 5B having the same mounting mechanism, thereby enabling either the receiving connector 4A or 4B to be selectively attached.

3 Claims, 2 Drawing Sheets

SOLENOID-OPERATED VALVE ASSEMBLY

FIELD OF THE INVENTION

The present invention relates to a solenoid-operated valve assembly comprising a plurality of solenoid-operated valves connected together, and in particular, to a solenoid-operated valve assembly adapted to simultaneously supply power to the plurality of solenoid-operated valves through a single receiving connector.

PRIOR ART

As shown in, for example, Japanese Utility Model Laid Open No. 7-22541, a solenoid-operated valve assembly is well known that comprises a plurality of separated manifold blocks; a supply and exhaust block including a supply port and an exhaust port; and a lateral pair of end blocks, all of which are integrally connected together by sequentially joining them together in the width direction, wherein a solenoid-operated valve is installed on each of the manifold blocks. In this solenoid-operated valve assembly, a receiving connector is attached to the supply and exhaust block, and a feeding connector connected to a power supply is connected to the receiving connector to supply power simultaneously to a plurality of solenoid-operated valves.

At the same time, the connectors used can take various forms, including rectangular and circular; different connectors must be used for different purposes depending on the structure of the product, the conditions at the site, and user requests.

In conventional solenoid-operated valve assemblies, however, the supply and exhaust block and the end block are designed to allow only one type of receiving connector to be attached thereto. Thus, the receiving connector cannot be solely replaced by a different type but must be replaced together with the supply and exhaust block and the end block. Thus, multiple types of supply and exhaust blocks and end blocks must be prepared that correspond to the forms of the receiving connectors, thereby increasing the number of required parts and requiring a cumbersome stock management process. In addition, replacing the blocks requires the solenoid-operated valve assembly to be disassembled and assembled again, in a complex replacement operation.

DISCLOSURE OF THE INVENTION

It is an object of this invention to provide a solenoid-operated valve assembly of an efficient design and structure that enables multiple types of receiving connectors of different forms to be selectively attached to end blocks.

To achieve this object, a solenoid-operated valve assembly according to this invention is characterized in that a mounting seat is formed on one of two end blocks located at the respective ends, in that a receiving connector is detachably attached to the mounting seat via a holder, and in that multiple holders individually holding receiving connectors of different forms can be selectively mounted on the mounting seat.

Thus, this invention does not require a cumbersome operation to replace the end block by disassembling the solenoid-operated valve assembly, but instead allows receiving connectors of different forms to be selectively attached by replacing the holders mounted on the end block.

According to a specific embodiment of this invention, the mounting seat is formed on the outer surface of a first end block, and a through-hole is formed at the position of the mounting seat so that a lead can pass through this hole. When the holder is mounted, the through-hole is covered by it.

This invention can provide a supply port and an exhaust port in at least one of the two end blocks to enable this end block to act as a supply and exhaust block.

DETAILED DESCRIPTION

Figure 1:
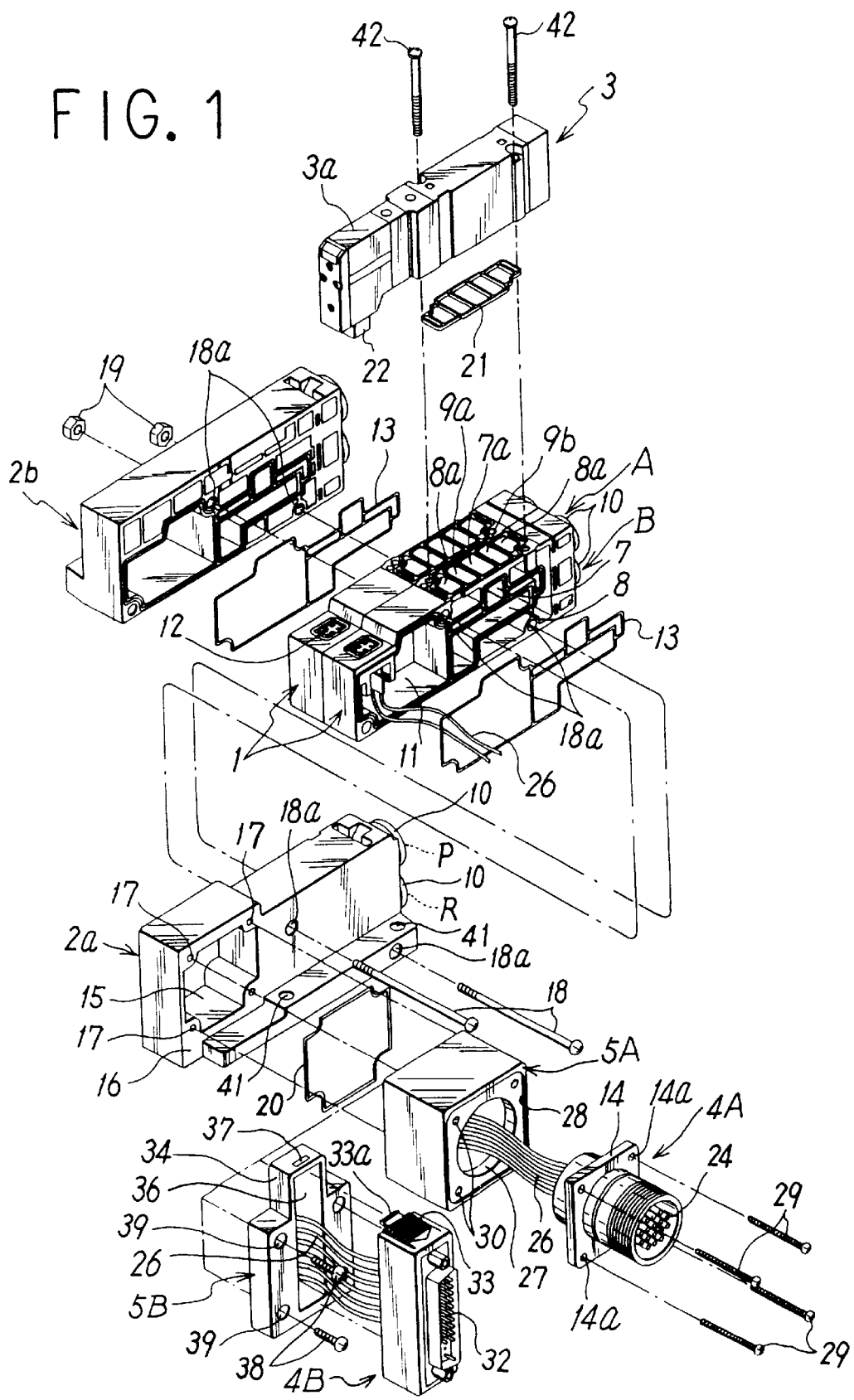
FIG. 1 is an exploded perspective view showing a first embodiment of this invention.

FIG. 1 shows a first embodiment of a solenoid-operated valve assembly according to this invention. This solenoid-operated valve assembly comprises a plurality of separated manifold blocks 1 connected together in the width direction; a first and a second end blocks 2a and 2b mounted on the respective ends of the manifold blocks 1 in the connecting direction; a plurality of solenoid-operated valves 3 installed on the respective manifold blocks 1; a receiving connector 4A or 4B for simultaneously feeding power to these solenoid-operated valves 3; and a holder 5A or 5B used to attach the receiving connector 4A or 4B to the first end block 2a.

Although this figure shows the two receiving connectors 4A and 4B of different forms and the holders 5A and 5B for attaching them, arranged in parallel, this does not indicate that these receiving connectors 4A and 4B are attached at the same time but that either the receiving connector 4A or 4B can be selectively attached for operation.

For convenience of description, the two receiving connectors 4A and 4B and the two holders 5A and 5B are collectively shown at 4 and 5, respectively, unless they must be mutually distinguished.

The manifold block 1 includes a supply channel 7 and an ejection channel 8 for a pressure fluid that penetrate the manifold block in the connecting (width) direction; the channels 7 and 8 are in communication with a supply opening 7a and an ejection opening 8a, respectively, opened into a valve installation surface at the top surface of the manifold block 1. In addition, two output ports A and B are provided in a front end surface of the manifold block 1, and the output ports A and B are in communication with output openings 9a and 9b opened into the valve installation surface.

Quick-type pipe joints 10 are attached to the output ports A and B. When a tube is inserted into the pipe joint 10, a claw engagingly locks into the tube to preclude it from slipping out. When a release bush is pressed in, the claw is disengaged from the tube to allow it to be pulled out.

A lead passage 11 through which a lead 26 passes that connects the receiving connector 4 to each solenoid-operated valve 3 is provided in the rear of the manifold block 1 in such a way as to penetrate the manifold block 1 in the connecting direction. A feeding terminal 12 for feeding power to a solenoid 3a in the solenoid-operated valve 3 is mounted in the top wall of the passage 11 so as to be removed using an appropriate means.

The channels 7 and 8 and the lead passage 11 are partitioned in an airtight manner using gaskets 13 provided between the manifold blocks 1 and 1 and between the manifold block 1 and the end block 2a or 2b.

The first end block 2a has in its front surface a supply port P and an ejection port R in communication with the channels 7 and 8 in the manifold block 1, respectively, in order to also act as a supply and exhaust block. The quick-type pipe joints 10 are attached to the ports P and R. A mounting seat 16 that allows the receiving connector 4 to be attached via the holder 5 is formed on the outer side of the rear end of the end block 2a, and a through-hole 15 through which the lead 26 passes is formed at the position of the mounting seat 16 in such a manner as to penetrate the first end block 2a in the width direction.

Four screw holes 17 used to fix the holder 5 are provided in the mounting seat 16 in the four respective corners of a square surrounding the through-hole 15. When mounted on the mounting seat 16, the holder 5 covers the through-hole 15.

The first receiving connector 4A has a cylindrical outer shape and includes a square flange 14 on the outer circumference of the middle of a shell incorporating a plurality of receiving pins 24. Four mounting holes 14a are provided in the four respective corners of the flange 14 at the same interval as the screw holes 17. The other ends of the leads 26 (in the illustrated example, flat cables) extending from the respective receiving pins 24 are connected to the respective feeding terminals 12 of the manifold blocks 1.

The first holder 5A used to attach the first receiving connector 4A to the mounting seat 16 is shaped like a box having a square front shape, and includes a circular insertion hole 27 into which the cylindrical shell of the receiving connector 4 and a square recess 28 into which the flange 14 is inserted. Four mounting holes 30 through which respective mounting screws 29 pass are provided in the four corners of the recess 28 at the same interval as the screw holes 17.

When the first receiving connector 4A is attached to the mounting seat 16, the holder 5A is allowed to abut on the mounting seat 16 via the gasket 20 with the receiving connector 4A fitted in the insertion hole 27 in the holder 5A, and the mounting screw 29 is used to simultaneously fix the receiving connector 4A and the holder 5A together.

At the same time, the second receiving connector 4B has a square outer shape and has an elastic locking piece 33 on the one longitudinal end surface of a rectangular shell including a plurality of receiving pins 32 with an engagingly locking protrusion 33a integrally formed at the tip of the elastic locking piece 33.

The second holder 5B used to attach the second receiving connector 4B to the mounting seat 16 includes a rectangular insertion hole 36 in which the receiving connector 4B is fitted and four mounting holes 39 through which respective mounting screws 38 pass and which are provided in such a way as to surround the insertion hole 36 at the same interval as the screw holes 17. One side of the holder 5B has its middle section protruding outward due to the presence of the connector insertion hole 36, and an engagingly locking hole 37 in which the engagingly locking protrusion 33a of the receiving connector 4B is engagingly locked is provided in the outer wall of the protrusion 34.

To mount the second receiving connector 4B on the mounting seat 16, the second holder 5B is mounted on the mounting seat 16 using the mounting screw 38, and the receiving connector 4B is fitted into the insertion hole 36 in the holder 5B to allow the engagingly locking protrusion 33a at the tip of the elastic locking piece 33 to be elastically engagingly locked in the engagingly locking hole 37. Alternatively, the holder 5B may be mounted on the mounting seat 16 after the receiving connector 4B is attached to the holder 5B.

To remove the receiving connector 4B from the holder 5B, the elastic locking piece 33 is manually pressed to remove the engagingly locking protrusion 33a from the engagingly locking hole 37; the protrusion may then be pulled out from the connector insertion hole 36.

The protrusion 34 does not need to face in the upward direction when the second receiving connector 4B and the second holder 5B are mounted on the mounting seat 16, as shown in the figure; instead, it may face in either the horizontal or downward direction.

On the other hand, the second end block 2b has substantially the same configuration as the first end block 2a except for the absence of an arrangement for attaching the receiving connector 4. That is, the second end block 2b does not include the lead insertion hole 15, connector mounting seat 16, or screw hole 17.

The second end block 2b, however, may have the same configuration as the first end block 2a to allow the receiving connector 4 to be attached. Thus, the receiving connector 4 can be selectively attached to either the end block 2a or 2b. In this case, the lead insertion hole 15 in the end block that is unused is occluded by an appropriate cover.

Each of the manifold blocks 1 and the end blocks 2a and 2b are connected together in an airtight manner using the intervening gaskets 13, a plurality of (in the illustrated example, two) connection bolts 18 passing through bolt through-holes 18a provided in these blocks in the connecting direction, and nuts 19 screwed onto the bolts. The supply and ejection channels 7 and 8 and the passage 11 are mutually in communication in an airtight manner.

The solenoid-operated valve 3 includes a pressure fluid supply port, two output ports on the respective axial sides of the supply port, and two ejection ports on the respective sides of the output ports (none of them shown). These ports communicate with the corresponding openings of the channels in the manifold block 1 in an airtight manner, when the solenoid-operated valve 3 is mounted on the valve installation surface of the manifold block 1 via a gasket 21 using screws. In addition, a receiving terminal 22 provided on the bottom surface of a pilot valve section 3a is electrically connected to the feeding terminal 12 when the solenoid-operated valve 3 is mounted on the valve installation surface of the manifold block 1.

The illustrated solenoid-operated valve 3 is a single-pilot-type solenoid-operated valve in which the solenoid in the pilot valve section 3a is magnetized and demagnetized to switch the two output ports between the supply port and the two ejection ports.

The solenoid-operated valve 3, however, is not limited to the single solenoid type but may be a double solenoid type having two solenoid-driven pilot valve sections. In addition, the solenoid-operated valve is not limited to the five-port type but may be a three- or four-port type.

Furthermore, the solenoid-operated valve 3 is not limited to the pilot type but may be a directly operated type in which a valve disc in the solenoid-operated valve is drive directly by the solenoid.

Reference numeral 41 in FIG. 1 designates mounting holes provided in the end blocks 2a and 2b to mount the solenoid-operated valve assembly on a support.

In the solenoid-operated assembly according to the first embodiment of the above configuration, one of the two receiving connector 4A and 4B of different forms is attached to the mounting seat 16 via the corresponding one of the exclusive holders 5A and 5B having the same mounting mechanism. Consequently, the receiving connector 4A or 4B can be selectively attached to the end block 2a. As a result, even if the receiving connector is replaced by one having a different form after the solenoid-operated valve assembly is assembled, the holder and the receiving connector can simply be replaced, without any need for the cumbersome operation of disassembling the solenoid-operated valve before replacing the end block 2a. Therefore, this invention enables an easy replacement operation.

Figure 2:
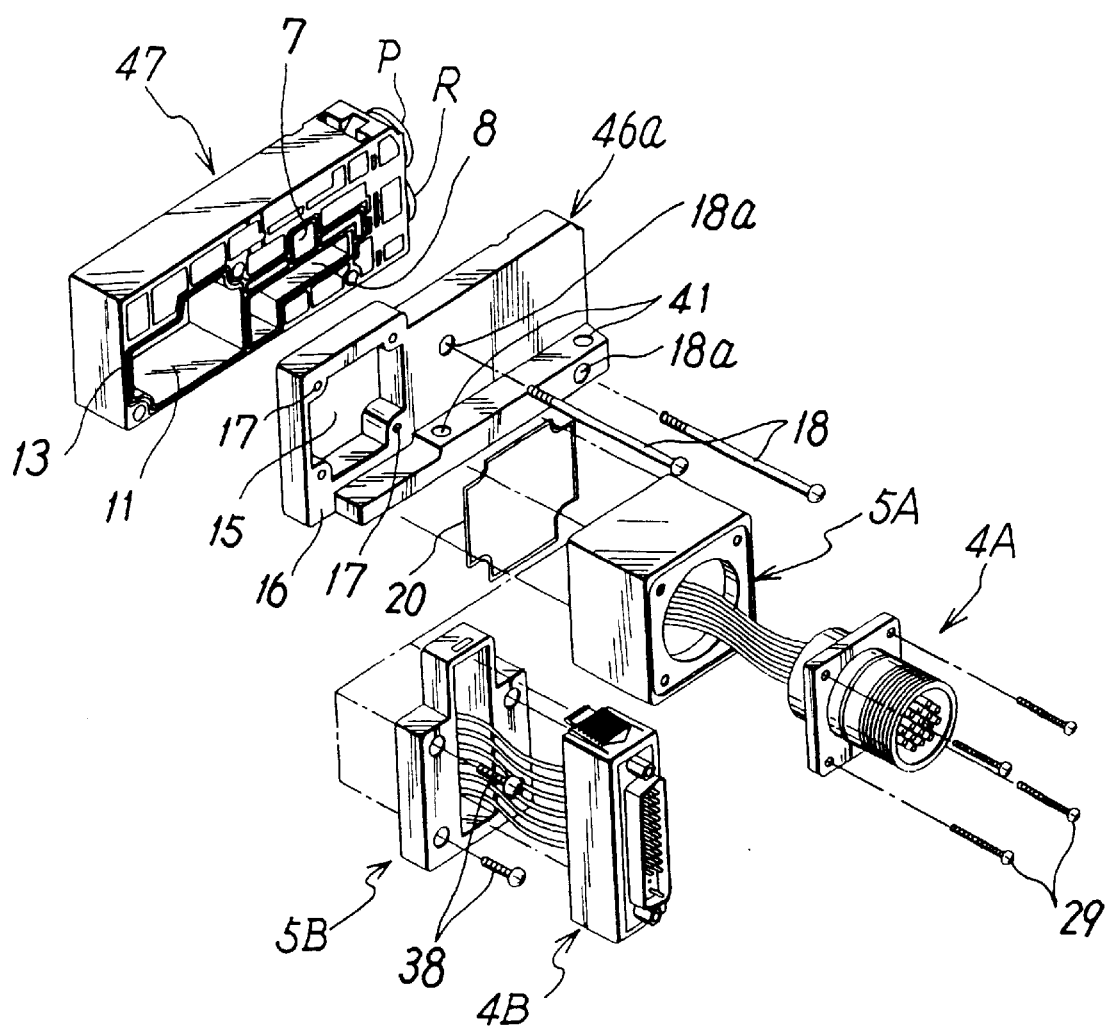
FIG. 2 is an exploded perspective view of the integral part showing a second embodiment of this invention.

FIG. 2 shows the integral part of a second embodiment of the solenoid-operated valve assembly according to this invention. The second embodiment differs from the first embodiment in that a first end block 46a does not act as a supply and exhaust block. That is, a supply and exhaust block 47 separate from the end block 46a is provided, and has a supply port P and ejection port R formed therein. Thus, the horizontal width of the end block 46a is slightly less than that of the end block 2a in the first embodiment because the end block 46a does not have a supply port P and ejection port R formed therein; otherwise, the configuration of the end block 46a is substantially the same as that of the end block 2a in the first embodiment.

As in the manifold block 1, the supply and exhaust block 47 includes a supply channel 7, ejection channel 8, and lead passage 11 penetrating the block 47 in the connecting direction, and the channels 7 and 8 are in communication with the supply and ejection ports P and R, respectively, opened into the front surface of the supply and exhaust block 47. The channels 7 and 8 are closed by the end block 46 mounted via the gasket 13.

Likewise, a second end block (not shown) located on the opposite side of the solenoid-operated valve assembly may be provided separately from the supply and exhaust block without the need to act as the same. Alternatively, the supply and exhaust block can be omitted.

What is claimed is:

1. A solenoid-operated valve assembly comprising a plurality of separated manifold blocks connected together in the width direction; a first and a second end blocks mounted on the respective ends of the manifold blocks in the connecting direction; a plurality of solenoid-operated valves installed on said respective manifold blocks; and a receiving connector for simultaneously feeding power to these solenoid-operated valves, wherein:

said receiving connector is attached to a holder, the holder being detachably mounted on a mounting seat formed on said first end block, the mounting seat allowing multiple holders individually holding receiving connectors of different forms to be selectively mounted thereon.

2. A solenoid-operated valve assembly according to claim 1 wherein said mounting seat is formed on the width-wise outer side of said first end block, a through-hole through which leads pass to connect the receiving connector to the solenoid-operated valves being formed at the position of the mounting seat in such a way as to penetrate the first end block in the width direction, the holder covering said through-hole when the holder is mounted on said mounting seat.

3. A solenoid-operated valve assembly according to claim 1 wherein a supply port and an exhaust port are provided in at least one of said two end blocks to allow the end block to also act as a supply and exhaust block.

* * * * *